N. OBOUKHOFF.
FREQUENCY CHANGER AND GENERATOR OF ALTERNATING CURRENT.
APPLICATION FILED FEB. 28, 1917. RENEWED JAN. 5, 1922.

1,426,001.

Patented Aug. 15, 1922.

N. OBOUKHOFF.
FREQUENCY CHANGER AND GENERATOR OF ALTERNATING CURRENT.
APPLICATION FILED FEB. 28, 1917. RENEWED JAN. 5, 1922.

1,426,001.

Patented Aug. 15, 1922.

N. OBOUKHOFF.
FREQUENCY CHANGER AND GENERATOR OF ALTERNATING CURRENT.
APPLICATION FILED FEB. 28, 1917. RENEWED JAN. 5, 1922.

Inventor
Nicholai Oboukhoff
By Percy Hunnour

N. OBOUKHOFF.
FREQUENCY CHANGER AND GENERATOR OF ALTERNATING CURRENT.
APPLICATION FILED FEB. 28, 1917. RENEWED JAN. 5, 1922.

1,426,001.

Patented Aug. 15, 1922.

Inventor
Nicholas Oboukhoff
By Percy Hammond

N. OBOUKHOFF.
FREQUENCY CHANGER AND GENERATOR OF ALTERNATING CURRENT.
APPLICATION FILED FEB. 28, 1917. RENEWED JAN. 5, 1922.

1,426,001.

Patented Aug. 15, 1922.
7 SHEETS—SHEET 7.

Inventor
Nikolai Oboukhoff
By Penny H——
atty.

UNITED STATES PATENT OFFICE.

NIKOLAI OBOUKHOFF, OF HARBIN, CHINA.

FREQUENCY CHANGER AND GENERATOR OF ALTERNATING CURRENT.

1,426,001. Specification of Letters Patent. Patented Aug. 15, 1922.

Application filed February 28, 1917, Serial No. 151,603. Renewed January 5, 1922. Serial No. 527,271.

*To all whom it may concern:*

Be it known that I, NIKOLAI OBOUKHOFF, a subject of the Emperor of Russia, residing at Harbin, China, have invented certain new and useful Improvements in Frequency Changers and Generators of Alternating Current; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The object of this invention is to provide apparatus for generating an alternating current of any desired periodicity or frequency; or for transforming an alternating current, supplied from some other source, into an alternating current the frequency of which may be any chosen multiple of the frequency of the current supplied.

Figure 1 represents, diagrammatically the essential features of the proposed frequency changer and generator of alternating current, whereas

Figure 14 illustrates a further modified form of the generator and frequency changer of this invention, in which all the stator windings are grouped in two diametrically opposite slots. The polar projections of the rotor and stator elements of this machine are equal in number and the slots, between adjacent polar projections or teeth, are of the same width as the polar projections as shown in Figure 14ª. These slots may however be of different width than the polar projections. Such an arrangement is shown in Figure 15.

Figure 16 illustrates a modified shape or form which may be given to the teeth or polar projections of either the rotor or stator elements or both.

Figure 1:
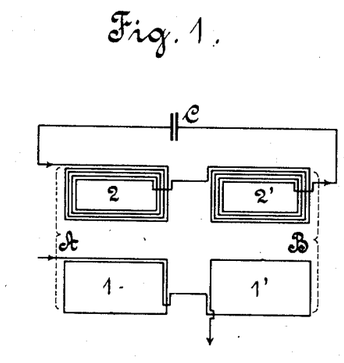

Referring to Figure 1, 1, 2 and 1', 2' designate two systems of primary and secondary windings or coils, the primary coils 1 and 1' of both systems being connected to each other in such a way, that an electric current will flow into the windings of both coils in opposite circular directions, and the secondary coils being, to the contrary, connected with each other in such a manner that the feeding current or the current generated in the windings of these coils will flow along the wires of the separate secondary coils 2 and 2' in one and the same circular direction, as indicated by arrows on the wires.

The coils 1, 2 and $1^1$, $2^1$ are placed within the field of influence of two independent magnetic circuits A and B, the magnetic circuit A influencing the coils 1 and 2; and the magnetic circuit B, the coils $1^1$ and $2^1$. If now it is desired to change or multiply the frequency of a current flowing in the windings 1 and $1^1$ it is only necessary to cause the magnetic conductance of both magnetic systems to pulsate with a distinct frequency $f^1$ in such a manner that the pulsations in the two independent magnetic circuits will be opposite in phase relation. Under these conditions in each of the secondary coils 2 and 2' there will be generated electromotive forces of various frequencies, the lowest of which will be equal, to the frequency $f'$ of pulsation of the magnetic flux or to the frequency $f$ of the feeding current, some harmonics of higher frequencies will be in phase with each other and the final result of such a pulsation of the magnetic current will be, that the amplitudes of such harmonics will be added, whereas the amplitudes of the remaining harmonics, which are in opposite phases, will be mutually compensated or neutralized. If in the circuit of the secondary coils 2 and 2' there is a condenser C tuned in resonance with any one of the higher harmonics the amplitudes of which are added, this will result in a still sharper appearance of the corresponding electromotive force of such a distinct frequency.

The result will be, of course, just the same if the connections between the coils 1 and 1' and 2 and 2' respectively should be changed simultaneously so that the current would flow through the coils 1 and 1' in one and the same direction and through the windings 2 and 2' in opposite directions.

Figure 2:
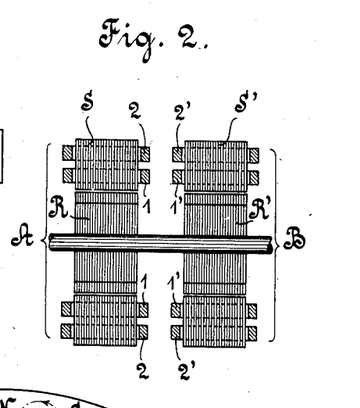
Fig. 2 shows, diagrammatically, a simple machine for reducing the invention to practice.

Figure 2 represents in a diagrammatical manner, a machine for performing a change in the frequency of an alternating current in the manner above indicated. The device comprises a laminated stator consisting of two similar halves S and S' and an also laminated rotor consisting of two similar halves R and R', the said rotor having teeth on its circumferential surface. The primary and secondary coils 1, 1' and 2, 2' are placed on the stator and connected to each other in the manner stated, viz, either in such a manner that the circular direction of the current in the primary coils is one and the same, whereas the current flows in the secondary coils in opposite circular directions, or vice-versa. The teeth on the parts R and R' of the rotor are displaced on the one part with reference to those of the other part in such a manner, that the pulsations of the magnetic conductance in the part A of the machine (parts S and R of the stator and rotor) are in opposite phases with the phases of pulsation in the part B of the machine (parts S' and R' of the stator and rotor).

Previously the same pulsations and the same final result will be attained, if the coils 1, 1' and 2, 2' were placed upon a rotor R, R' encircled by a stator having the teeth on the two separate parts of the machine displaced in the required manner.

By combining several of such machines fixed upon one and the same or upon various shafts and electrically connected to each other in cascade relation, it is possible to perform a change of frequency in several stages as will be more fully explained hereinafter in connection with other figures of the drawings. This change of frequency in several stages may be however performed in one and the same machine. Such a machine is diagrammatically shown in Figure 2 in which the current of a higher frequency flowing in the secondary coil and strengthened by the condenser C generates, by the aid of the pulsations of the magnetic conductance, in the primary coils harmonics of an electromotive force of a still higher frequency. Some of the latter harmonics therefore will be added and by means of another condenser placed in the circuit a current of these higher frequencies will be strengthened, which, in its turn, will react upon the secondary coils once more so as to generate an electric current of a still higher frequency, etc.

According to a further modification, the current of primary frequency (that is to say, the current the frequency of which is to be changed) is generated in the primary coils of the frequency changer by combining with the same a magnetizing system of constant current (that is a direct current excitation winding) and by utilizing the pulsations of the magnetic conductance already referred to with a view to changing the frequency. If, for instance, the frequency of pulsation of the conductance of the magnetic circuit is that of the primary frequency "$f$" of the generated electric current feeding the primary coil, the change of the frequency in several stages will give, the following series of frequencies, viz, $2^f$, $3^f$, $4^f$ . . . If the frequency of pulsation of the magnetic conductance is equal to $2^f$, a series of frequencies equal to $3^f$, $5^f$, $7^f$ . . . $13^f$ . . . will be realized as a result of a change in several stages.

Figure 3:
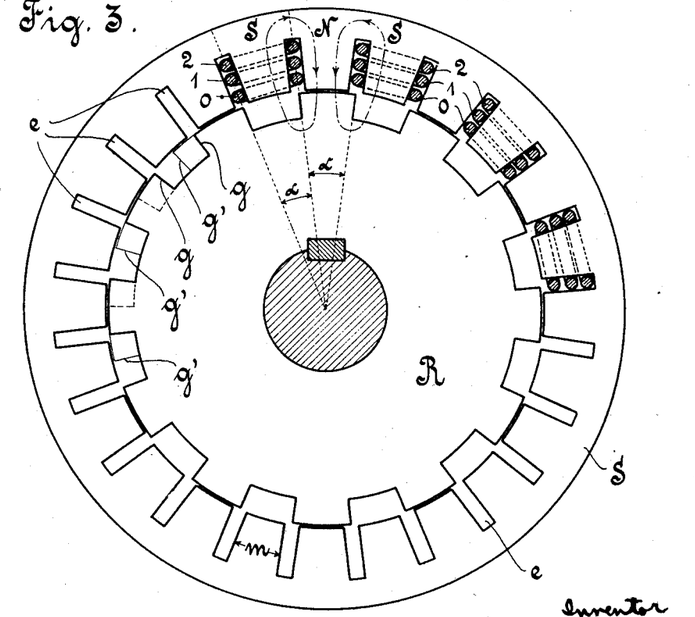
Figure 3 is a view, partly in section, of one of the halves of such a machine as is shown in Figure 2, with a third or excitation winding added.
Figure 4:
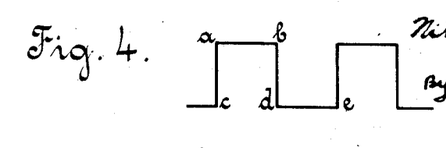
Figure 4 is a diagram showing a wave type of winding for the coils of the stator element of Figure 3.
Figure 8:
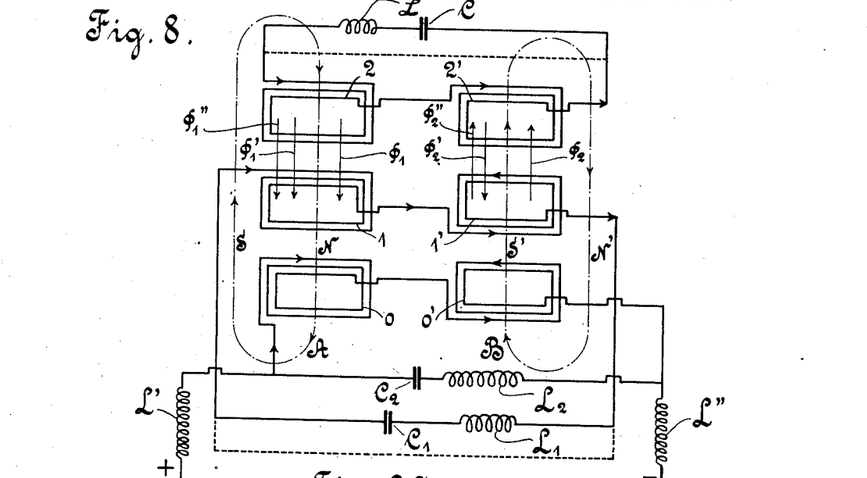
Figure 8 and Figure 8ª are wiring diagrams showing the relation of the windings of the machine to external circuits.

Fig. 3 shows in a diagrammatical manner one of the two similar halves A and B of a generator and frequency changer constructed in accordance with the principles of this invention, and Fig. 8 the electric connections of the coils, placed also in this case on the stator. Each half of the machine comprises a stator S and a toothed rotor R, both the stator and the rotor, being made of thin iron sheets insulated from each other. In the laminated stator S there are provided slots, grooves or nests $e$ equally distanced from each other and quite equal also in form and dimensions. Within these slots or nests there are placed two or more coils 0, 1, 2 . . . , of which one, for instance, the coil 0, is fed by a direct exciting current, so that this coil will serve to generate in one of the remaining coils (1, 2 . . . .) an alternating current of a primary frequency $f$. The windings of the coils may be of the wave type as showed on Fig. 4, on which $a$—$c$ and $b$—$d$ are conductors which occupy in the nests $e$ a position parallel to the axis of the rotor, whereas $d$—$e$ and $a$—$b$ are the end connections; or the windings of the said coils may be of a loop type and of such a kind, that the current flowing along them produce a regular alternation of the magnetic polarity in the iron of the stator between the various slots $e$, as indicated at the top of Fig. 3 by the dotted lines N—S. When coils of the wave type (Fig. 4) are used, the said alternation of the polarity is always secured.

The rotor R is provided with teeth $g$ separated from each other by intervals of the same circumferential length, and two slots or grooves $e$ of the stator correspond to each tooth $g$ as clearly shown on Fig. 3. The coils 0, 1, 2 . . . of one half S of the stator are connected with the corresponding coils 0′, 1′, 2′ . . . of the other half S′ of same (Fig. 8) in the manner already explained in connection with Figs. 1 and 2, that is to say in such a manner that if the current flows in one pair of coils in one and the same circular direction in two coils constituting the said pair (coils 2 and 2′ on Fig. 8), the current will flow in the remaining pair of coils (coils 1, 1¹ and 0, 0¹ on Figure 8) in opposite circular directions. The teeth $g'$ of the half R′ of the rotor are displaced with reference to the teeth $g$ of the other rotor half R by an angle equal to $\alpha(\div)2$ with a view to causing the magnetic conductance in both halves to pulsate in such way that the phases of pulsation are opposite.

Instead of this arrangement, the teeth $g$ and $g'$ may however correspond to each other in position if the grooves or slots $e$ of the two halves S and S′ of the stator are correspondingly displaced.

Such a frequency changer and generator of alternating current will generate an alternating current of a primary frequency and change this primary frequency in the desired manner.

Figures 5, 6, 7:
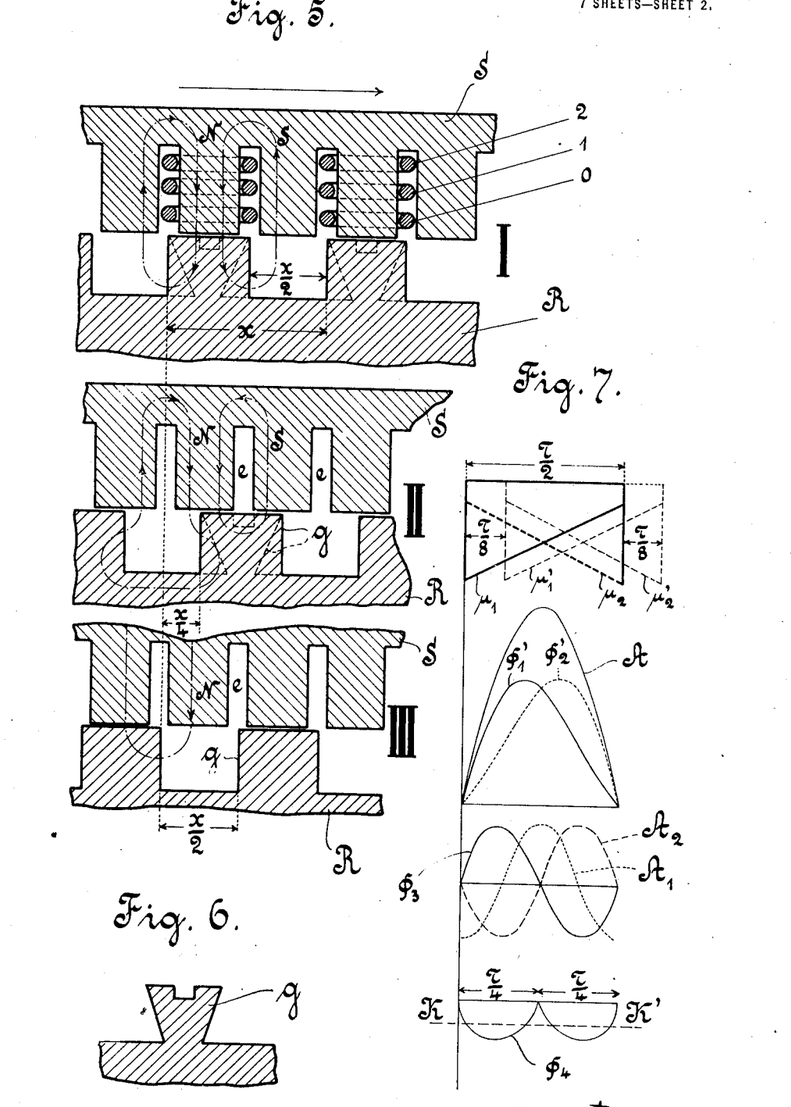
Figure 5 is a sectional development in three parts (I, II III) showing three successive relative positions of one of the rotor elements to the corresponding stator element of a generator and frequency changer designed in accordance with the principles of this invention.
Figure 6 shows a preferred shape or form to be given to the teeth of the rotor element. It is designed to accentuate the pulsation of magnetic conductance.
Figure 7 shows a series of curves plotted to facilitate a study of the principles involved in the design of this machine.

By the dotted lines N—S in Figure 5 there is indicated the direction of the magnetic flux excited in both halves A and B of the machine by a direct current flowing along the pairs 0, 0′ of coils. When the teeth of the rotor with reference to the coils placed on the stator occupy the position I of this figure, there will exist the lowest magnetic conductance, i. e., the magnetic reluctance is greatest and therefore the magnetic flux N—S will be also the smallest. At the position II the magnetic conductance and flux attain their maximum. To go from position I to position II the rotor has rotated through the angle $\alpha(\div)2$ (Fig. 3). After an equal further rotation the rotor occupies the position III at which the magnetic conductance will again attain its minimum. The said alternation of the maximum and minimum of the magnetic conductance will therefore be completed during a rotation through the angle $\alpha(\div)2$ and therefore the complete period of pulsation of the said magnetic conductance will correspond to a rotation through an angle $\alpha$ corresponding to the breadth (width) of the tooth of the rotor element. In order to have these pulsations in the two halves of the machine A and B opposite to each other in phase relation the position of the teeth $g'$ on the rotor part R′ of the half B (Figs. 2 and 3) are displaced by an angle equal to $\alpha(\div)2$ with reference to the teeth $g$ of the rotor part R of the half A, or, as has been already stated, the same result is attained by displacing accordingly the grooves or nests $e$ of the stators S and S′. Under these conditions the magnetic conductance will at one and the same time increase in one part A of the machine and decrease in the second part B and the maximum of magnetic conductance in the first half will coincide in time with the minimum of the said conductance in the second half.

The pulsations of the magnetic conductance will be greater and sharper if the teeth of the rotor element have the shape shown on Fig. 6 (see also dotted lines on Fig. 5). In this case also the difference between the maximum and minimum magnetic conductance will be greater. As a result of these pulsations of magnetic conductance, and the magnetic field produced by the direct current excitation winding, electromotive forces are induced in the pairs of coils 0, 0′; 1, 1′; 2, 2′ . . . It must be noted, however, that in the excitation coils 0, 0' and also in the coils 1, 1' the induced E. M. F.'s, will neutralize each other, due to the opposed method of connecting the windings of these coils; while in the coils 2, 2', and other coils, which are so wound and connected that currents will circulate in them on the same circular direction, there will be induced alternating E. M. F.'s which are in phase and will therefore be added to produce an alternating-current of primary frequency equal to the frequency of the pulsations of the magnetic conductance. This will be quite clear from the following observations. On Fig. 8 the magnetic fluxes $\phi_1$ and $\phi_2$ shown by arrows and induced by the direct current of the coils 0, 0' in both halves A and B of the machine, are opposite to each other in direction when the connections are made as shown on the drawing. In view of the fact that the phases of magnetic pulsation are opposite, the electromotive forces in the coils 0 and 0' are equal to each other and have one and the same direction; the connections of the coils 0 and 0' are, however, such that the said electromotive forces act against each other and are therefore mutually compensated not only in these coils but also in the coils 1, 1' and in all other coils having the same order of connection as the pair of coils 0, 0'. But as far as the pair of coils 2, 2' and other like connected pairs of coils are concerned the electromotive forces, having an equal value and one and the same direction, are added one with the other.

If in all pairs of coils the order of connections should be simultaneously changed to the inverse one, the net result attained will be the same. That is to say the electromotive forces in the windings of the coils 0, 0', 1, 1' and other like connected coils will be compensated and neutralized, whereas the electromotive forces in the coils 2 and 2' and other like connected coils will be added on account of the fact, that when the order of connections is changed to the inverse one, the direction of the one of the two fluxes N—S and N'—S' in both halves of the machine will be changed and thus in this case the two fluxes will receive one and the same direction whereas the phases of their pulsations remain opposite.

With a view to strengthening the action of the electromotive forces of primary frequency, which are added in the coils 2, 2', there may be—in accordance with what was already stated in connection with Figs. 1 and 2—, included in the circuit of the coils 2 and 2' a condenser C and, if desired, also an inductance L and the whole circuit 2, 2', C, L tuned in resonance with the electromotive forces of primary frequency. The electromotive force of primary frequency in the coils 2, 2', amplified and strengthened by the resonant conditions in that circuit will react on the coils 0, 0', and 1, 1' and other like connected coils, which are free from electromotive forces of this frequency (i. e., the primary frequency) to induce in them an electromotive force of a double frequency, as will be hereinafter explained in connection with Figure 7. In Fig. 7 the ordinates represent electromotive forces, currents and fluxes corresponding to different intervals of time represented by the abscissæ. The length $\tau(\div)2$ represents the time corresponding to half a period of the electromotive force of primary frequency within the coils 2, 2'. The line $\mu$ represents the character of changes of the magnetic conductance in the half A of the machine, beginning with the maximum and ending with the minimum of same conductance, which full change corresponds to half a period of the alternating current generated by this magnetic pulsation. The line $\mu_1$ is very nearly a straight line but is not necessarily a straight line, provided it represents a declining or mounting magnetic conductance between its maximum and minimum.

The dotted line $\mu_2$ represents the character of changes of the magnetic conductance in the half B of the machine produced within the same period of time. But since in accordance with the above statement, the phases of $\mu_1$ and $\mu_2$ are opposite to each other, $\mu_2$ has a mounting character while $\mu_1$ has a declining one.

The line A on the same Fig. 7 represents the electromotive forces of primary frequency within the coil 2, 2'. This curve has, on account of the method of resonance used, the sharply expressed character of a sinusoidal curve. In accordance with the same character of changes of the magnetic conductance during the distinct period of time, shown on the drawing (which is equal to half a period), the sinusoidal curve A gives the value and the phases of the electromotive force. Furthermore in view of the fact, that, when the resonance method is used, the current is in phase with the electromotive force, the same sinusoidal curve represents also—(of course in another scale) in value and phase the current circulating in the circuit 2, 2' C, L and the magnetizing force (ampere-turns) of the coils 2 and 2'. Thus the coil 2, (Fig. 8) tends to cause the flow of an alternating magnetic flux $\varphi_1^1$ through the loops of the coil 1 (if coils of the loop type are used) or to embrace by the said flux the wires of these coils 1 (in case of coils of the wave type) placed in the nests $e$ (Figs. 3 and 5) of the stator. The coil 2' will exert a similar influence upon the coil 1' of the second half of the machine and produce an alternating magnetic flux $\varphi_2^1$ (Figure 8). In view of the opposite or inverse character or order of the connections between the coils 2 and 2' and the coils 1 and 1' respectively, as shown by arrows, the changes of the electromotive force in the pair of connected coils 1, 1' will be represented in an appropriated scale in phase by the difference between the fluxes $\varphi_1^1$ and $\varphi_2^1$. In view however of the fact that the value of a magnetic flux is proportional to the products of the magnetizing force (ordinates of the curve A) and the magnetic conductance (ordinates of the lines $\mu_1$ and $\mu_2$), the fluxes during a distinct period, represented by curves $\varphi_1^1$ and $\varphi_2^1$ in an appropriated scale, possess an unsymmetrical shape on account of the influence of the pulsations of magnetic conductance, the maximums of both curves $\varphi_1^1$ and $\varphi_2^1$ being displaced, each, in the direction of the maximum values of their magnetic conductance $\mu_1$ and $\mu_2$. The curve $\varphi_3$ (Fig. 7) represents the difference at each moment of time between the flux $\varphi_1^1$ and $\varphi_2^1$ and consequently predetermines the value, the character, the phase and, generally speaking, the law of change of the electromotive force in the groups of coils 1, 1' . . . in an appropriate scale. As appears from Fig. 7, this curve $\varphi_3$ shows a double frequency, as compared with the curve A and is similar to the sinusoidal curve, so that the changes of the electromotive force in the groups of coils 1, 1' can be represented by a curve, like the curve $A_1$, in an appropriate scale, which lags in reference to the curve $\varphi_3$ for a quarter of period. If now there be placed in the circuit of the coils 1, 1' in series connection, a condenser C' and an inductance L' so proportioned and adjusted as to produce a resonance of the electromotive forces of double frequency, there will be produced in the circuit 1, 1' C, L a current and consequently a magnetizing force, (ampere-turns) represented by the curve $A_1$. It has been already mentioned, that the combination or the order of connection of the coils 1, 1' is the same as the combination or the order of connection of the coils 0, 0' and therefore also in these latter coils there will be induced an electromotive force of double frequency. In order to avoid any interference between the electromotive force of double frequency and the source of direct current feeding the excitating coils 0, 0', inductances or choke coils L' and L" are placed in the circuit of these excitation windings, as shown in Figures 8 and 8ª. This electromotive force of double frequency, which is in phase with the electromotive force in the coils 1, 1', may be utilized by a further application of the resonance method as by including in the circuit of the coils 0, 0' a condenser $C_2$ and an inductance $L_2$; or by connecting the groups of coils 0, 0' and 1, 1' together in series in such way, that the electromotive forces of double frequency will be added and then applying the method of resonance to this combined system of coils 0, 0' and 2, 2' as shown on Fig. 8ª, by the use of a condenser $C_1$ and an inductance $L_1$.

From the foregoing it is obvious that it is possible to dispense with the coils 1, 1' so that the frequency changer and generator of alternating current will have only the groups of coils 0, 0' and 2, 2'.

As has been already explained the curve $A_1$ represents also the magneto-motive force of double frequency of the coils 1, 1'. The action of this magneto-motive force is combined with the action of the pulsations of magnetic conductance represented by the lines $\mu_1$ and $\mu_2$ and induces in the coils 2, 2' electromotive forces of a triple frequency. In order to strengthen the action of these electromotive forces the resonance method is applied to the coils 2, 2' making use of a new combination of a condenser and inductance. We now have induced in the windings 2, 2' two electromotive forces of different frequencies, one of primary frequency $f$, and the other of a triple frequency $3^f$. This circuit is already tuned for a resonant condition of the E. M. F. of primary frequency, and may be also tuned by properly grouping capacity and inductance so that it will at the same time be resonant with regard to the E. M. F. of triple frequency. With a view of avoiding the difficulty of tuning the circuit of the windings 2, 2' for the E. M. F.'s of different frequencies and to make the electromotive forces of various frequency more independent of each other— both in their electrostatic as well as in their galvanic conditions—there may be added a new group of coils connected in the same manner as the coils 2, 2' and the method of resonance may be then applied to the electromotive forces of triple frequency in the new group of coils. The same method is applicable also to the electromotive forces of quadruple frequency, that is to say, there may be either applied to the coils 0, 0' and 1, 1' a simultaneous resonance of the electromotive forces of double and quadruple frequencies or in each of the nests of the stators S, S' there may be inserted a new pair of coils, connected in the same manner as the said groups of coils 0, 0' and 1, 1' and then in this separate group of coils the method of resonance may be applied to the electromotive forces of quadruple frequency.

Generally the magneto-motive force of an increased frequency, in combining its action with the action of the pulsations of magnetic conductance in the manner already described produces an alternating magnetic flux having a sharply appearing harmonic, the frequency of which is equal to the sum of the primary frequency and that of the magneto-motive force. Such a field harmonic induces in the coil groups of the stator electromotive forces of its own frequency, and for each electromotive force of a certain frequency there may be placed within the slots of the stator a corresponding or separate group of coils connected as described above, and the action of them may be strengthened by applying the method of resonance to this group of coils.

Figures 8A, 9:
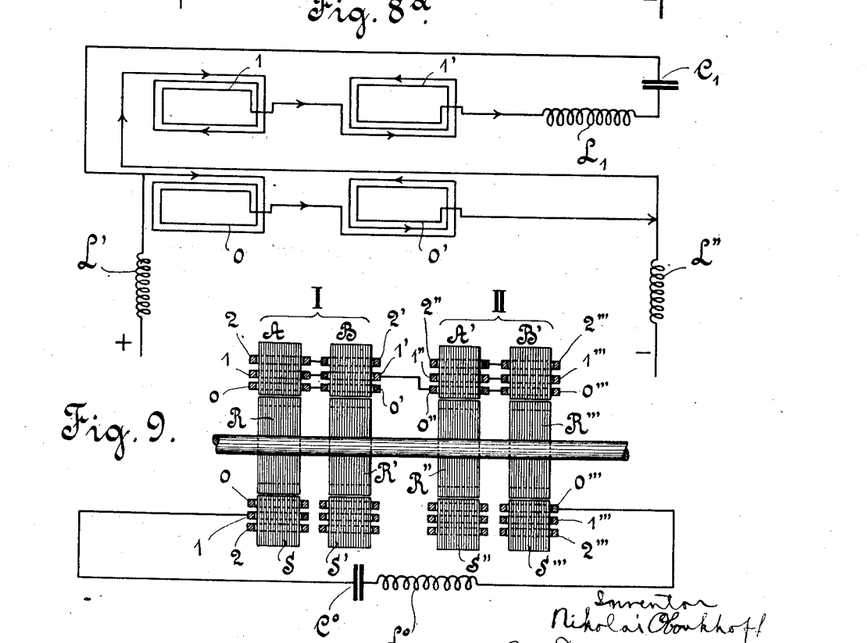
Figure 9 shows diagrammatically one method of connecting two machines (I and II) in the so called cascade order of connection.

Furthermore, it is possible by sending the alternating current induced in an apparatus of the described kind and already subjected to a change of frequency, into a like apparatus, and to produce in the same a further increase or multiplication of the frequency. This is accomplished, as already suggested, by connecting similar machines in cascade. Fig. 9 shows one of the various possible combinations of two machines I and II connected in cascade. The said machines are connected together in series and mounted on a common shaft. The reference characters on this figure follow the general scheme of the preceeding figures and the coils are connected as shown in Figure 8ª. The direct current flowing in the groups of coils 0, 0′, aided by the pulsations of magnetic conductance, induces in the groups of coils 2, 2′, an electromotive force of primary frequency $f$. This electromotive force strengthened and amplified by the resonant condition of the circuit 2, 2′, C, L, (Figure 8) induces in the coils 1, 1′, an electromotive force of double frequency. The windings 1, 1′, of the frequency changer I are electrically connected to the groups of coils 0″, 0‴, of the frequency changer II, and in this circuit there is also included a condenser C° and an inductance L°, thus forming a closed circuit including 1, 1′, 0″, 0‴, L° C°. This circuit is tuned for resonance on the electromotive force of double frequency. The phase of this electromotive force, as well as the phase of the current produced by the same, is represented by the curve $A_1$ (Fig. 7). In view of the fact that either the teeth of the rotor, or the nests of the stator of the one changer II are displaced with reference to those of the other frequency changer I for a distance corresponding to the angle $\alpha(\div)8$, the curves representing changes of the magnetic conductances in the frequency changer II (Fig. 9) are shown on Fig. 7 by the dotted lines $\mu_1^1, \mu_2^1$. Under these conditions and at the said relative position of the diagrams of the magnetic conductances and the current diagram $A_1$, the frequency of the electromotive force will be again doubled and in the coils 2″, 2‴ of the frequency changer II there will be induced an electromotive force of quadruple frequency. By further application of the method of resonance to the group of the coils 2″, 2‴ and as a result of the combined action of the current in these coils and of the pulsations of the magnetic conductance there may be induced in the group of coils 1″, 1‴ an electromotive force of quintuple frequency.

It is entirely possible, of course, to utilize the machine or groups of machines and circuits herein described, purely as a frequency changer, the current the frequency of which it is desired to change, being generated in another and entirely separate machine.

The explanations given herein are based upon the following general theory of a frequency changer and generator of alternating current. Suppose that in one of the groups of coils, for instance in the coils 1, 1′ of Fig. 8, there is produced a current either generated in the machine itself or supplied to it from some external source, which has a frequency $f$ and that, furthermore, the magnetic conductances of the two magnetic circuits pulsates with a frequency $f'$. If the current feeding the coils 1, 1′ is furnished from some external source, the frequencies $f$ and $f'$ are quite independent of each other and their values may be selected in accordance with the mechanical and constructional requirements. By connecting several frequency changers in cascade, as shown in Figure 9, it is possible to obtain a wider range in the attainable changes of frequencies.

If current fed from some external source has a frequency $f$ and the number of poles is "$p$" and the angular velocity of the rotor —$w$, then in each half A and B of the apparatus there will be produced two magnetic fields which rotate in opposite directions at a speed $$w' = 2\pi f(\div)p/2$$

The speeds of rotation of the fields in reference to the rotor will be $$w' + w = \frac{2\pi f}{p/2} + w \text{ and } w' - w = \frac{2\pi f}{p/2} - w.$$

In view of the fact, that, in accordance with the supposition made, the rotor rotating with the speed $w$ produces in the magnetic circuit pulsations of the frequency $f'$, the frequencies of pulsations of the rotating magnetic fluxes will be, under the said relative speeds of the rotating fields, changed in relation $$\left(\frac{2\pi f}{p/2} + w\right) : w$$

for the field which rotates in a direction opposite to the direction of rotation of the rotor, and $$\left(\frac{2\pi f}{p/2} - w\right) : w$$

for the field which rotates in the direction of rotation of the rotor. The frequencies of pulsation of the rotating magnetic fluxes will be therefore $$f_2 = f'\left(\frac{2\pi f}{p/2} + w\right) : w \text{ and } f_2' = f'\left(\frac{2\pi f}{p/2} - w\right) : w$$

for one and the other field respectively. These pulsations of the rotating magnetic fields induce in each coil of another group, e. g. in the coils 2, 2', electromotive forces of their own frequencies and these electromotive forces being harmonics of a higher order, are superimposed upon the electromotive force of the primary frequency of the current from an external source. As far as the signs and phases of these higher harmonics are concerned, it is necessary to remember, that the magnetic fluxes which are sent by the coils 1 and 1' through the coils 2 and 2' respectively, have opposite signs and that the higher harmonics are produced by the pulsations of such fluxes of opposite signs, but that, on the other hand, the phases of pulsations in both halves A and B of the apparatus are also opposite to each other, that is to say, they have opposite signs, and that, therefore, the harmonics induced in the coils 2 and 2' will have the same signs and will be added to each other arithmetically, if the connections between the coils 2 and 2' are as has been indicated.

In each coil 2 and 2' there will be induced, besides the said harmonics, also electromotive forces of the primary (fundamental) frequency $f$, which are produced by the alternating field of the feeding current circulating in the coils 1 and 1' and are independent of the magnetic pulsations. These electromotive forces are however mutually compensated in the coils 2 and 2' on account of the order of connections of the coils 1 and 1' and 2, 2'. Therefore in the coils 2, 2' only the electromotive forces of the said higher harmonics, that is to say of increased frequency, will be active.

If $f' = nf$, where $n$ may be of any value, and if by $w$ and $w'$ there are designated respectively the angular speed of the rotor and the angular speed of the rotating fields (into which fields the field of the alternating current supplied to the apparatus or produced within the same may be theoretically divided) and if by "$p$" there will be indicated the number of magnetic poles of the stator, produced by the current, the resulting frequencies $f_2$ and $f_2'$ of higher harmonics will be $$f_2 = \frac{f'(w'+w)}{w}; \text{ and } f_2' = \frac{f'(w'-w)}{w};$$

or, as $$\frac{w}{w'} = \frac{f'}{f} = n,$$

$$f_2 = f(n+1) \text{ and } f_2' = f(n-1).$$

If we put $f = f'$ we will have $$\frac{2\pi f}{p/2} = w$$

that is to say, the speed of rotation of the field will be equal to the speed of rotation of the rotor so that the harmonic with the frequency $$f_2' = \frac{f'\left(\frac{2\pi f}{p/2} - w\right)}{w}$$

will disappear, whereas the remaining harmonic $$f_2' = \frac{f'\left(\frac{2\pi f}{p/2} + w\right)}{w} = 2f'$$

will receive a double frequency.

By these theoretical observations the conclusions made in connection with Fig. 7, are confirmed, as Fig. 7 refers to the case when the frequencies $f$ and $f'$ are equal and the primary current is generated by the magnetic pulsation of the apparatus itself. The retroactive influence of the current of double frequency $2^t$ strengthened by resonance and combined with the magnetic pulsations, the frequency "$f$" of which remains unaltered, will produce in the other group of coils electromotive forces and currents of triple frequency as the application of the formula $f_2 = f(n+1)$ proves, in which formula we have to substitute in this case "$2^t$" for "$f$" and "$\frac{1}{2}$" in place of "$n$." The further application of this formula will prove that in the case of equality of the frequency of magnetic pulsation and the primary frequency $f$ of the current (either generated by the apparatus itself or sent into it by another frequency changer of the same system or by any other source of current)—the frequencies attainable by this method are given by the range: $f$, $2^t$, $3^t$, $4^t$, $5^t$, . . . . If $n = 2$, the resulting frequencies will be:

$$f_2 = 3^t \text{ and } f_2' = f.$$

The current of triple frequency $f_2$ strengthened by means of resonance may be subjected to a further change in the manner already stated. As then $$f_2 = 3^t \text{ and } f' = 2^t$$

we get $f' = 2/3 f_2$ and therefore the resulting increased frequency of current will be $$f_3 = f_2(2/3 + 1) = 5/3 f_2 = 5^t.$$

The general conclusion to be drawn from this is that in the case when the frequency of magnetic pulsation of the apparatus is twice the primary frequency of the current, the frequencies obtainable are given by the range $f$, $3^t$, $5^t$, $7^t$, $9^t$. By substituting for the coefficient $n$ different numerical values any desired range of multiplied frequencies can be secured. This may be attained by combining the speed of rotation with appropriate numbers of teeth.

In some cases in order to strengthen the current, and consequently the field and magnetomotive force, it may be desirable to use the method of short circuiting, instead of the method of resonance. It may be, for instance, convenient and advantageous to short circuit the coils 2, 2' in which an electromotive force of primary frequency is induced (see dotted lines on the top of Fig. 8) or to apply to these coils as heretofore the method of resonance, and to put in short circuit the coils 1, 1' in which, as has been shown, there is induced an electromotive force of double frequency. The short circuited current lags in phase for a quarter of a period behind the electromotive force of double frequency $A_1$ and may be represented by the curve $A_2$ on Fig. 7. The magnetic fluxes $\varphi_1''$, $\varphi_2''$ which are sent (see Fig. 8) by the coils 1, 1' into the coils 2, 2' firstly oppose each other because of the directions of the current in the coils 1, 1' and the character of connections of the coils 2, 2' and secondly they assume an unsymmetrical shape due to the pulsations of the magnetic conductance and the fact that these pulsations in both halves A and B of the apparatus are in opposite phases. In one of the halves, for instance in the half A, the displacement of the maximum point on the curve representing one of these fluxes $\varphi_1''$, $\varphi_2''$, will be to the left on Fig. 7 and in the other half B to the right on the same diagram corresponding with the diagrams of magnetic conductances $\mu_1$ and $\mu_2$. The resulting value of the magnetic flux circulating in the coils 2, 2', will be represented by the curve $\varphi_4$, the period of which is equal to a quarter of the period of the primary current, as shown on Fig. 7. It is however possible to imagine this curve as a result of addition of the ordinates of some straight line K, K' and of a curve having a periodicity equal to $\tau(\div)4$. Thus in the coils 2, 2', there will be induced an electromotive force of quadruple frequency in addition to one of double frequency. This circuit may be tuned for resonance for both of these electromotive forces, or a supplementary group of coils may be added, connected in the same manner as the coils 2, 2', and this circuit tuned for resonance for the electromotive force of higher frequency.

The short circuiting of one of the groups of coils produces a change to a quadruple frequency of the current produced in one apparatus in two steps, whereas when only the method of resonance is used, it will be possible to attain in two steps only a triple frequency of the induced current.

A current having a frequency equal to 4' and 5' in two or three steps of transformation respectively may be obtained also by using two similar frequency changers connected together in cascade, as has been already explained in connection with Fig. 9.

Figure 10:
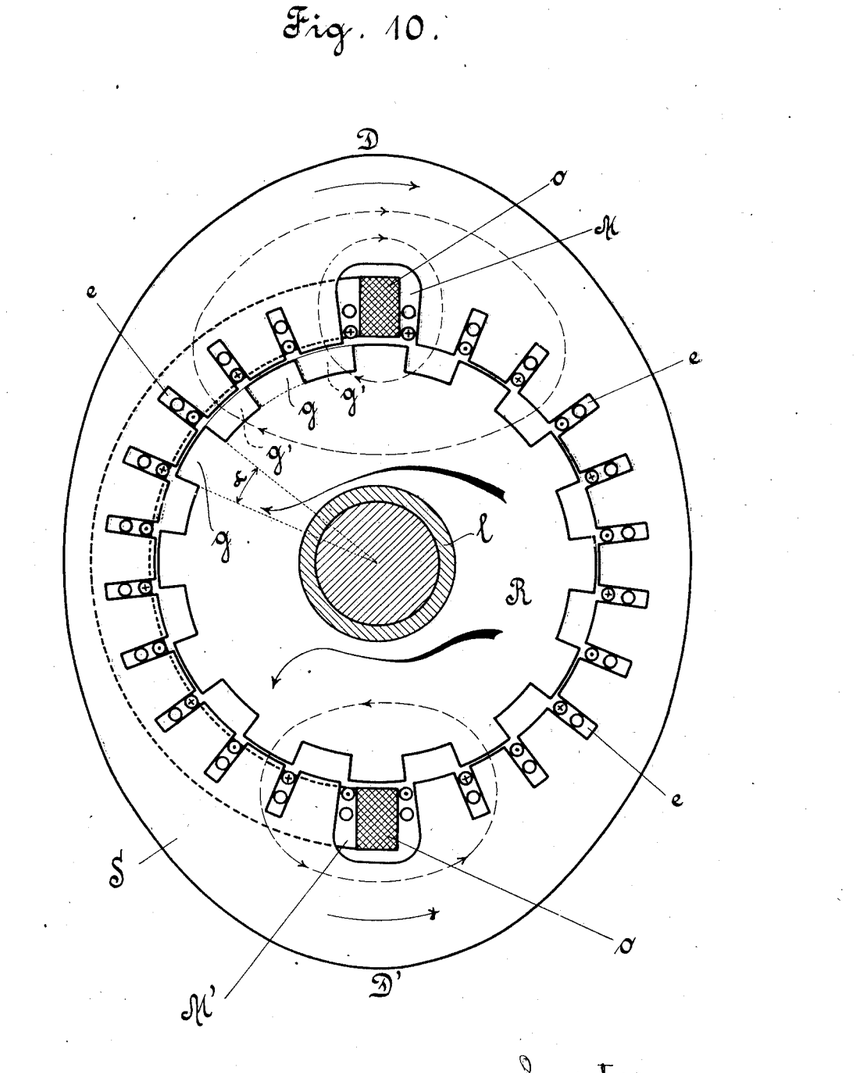
Figure 10 shows a modified form of machine, embodying the principles of this invention, in which the excitation windings are arranged in two diametrically opposite slots of the stator, instead of being distributed in all the slots of the latter.
Figure 11:
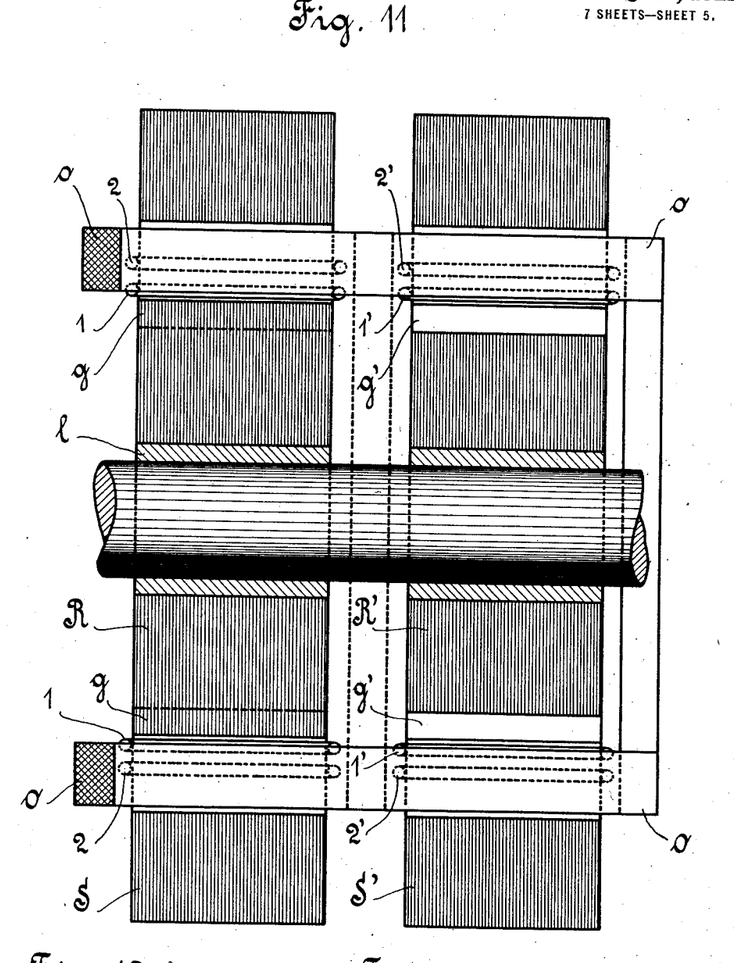
Figure 11 is a sectional view of the machine shown in Figure 10.
Figure 12:
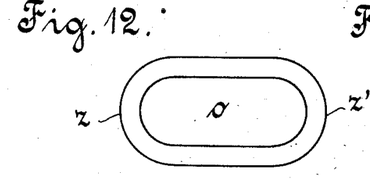
Figure 12 illustrates the simple form of the excitation winding 0 before it is placed in the slots of the stator.
Figure 13:
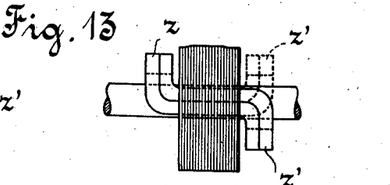
Figure 13 illustrates the manner in which the ends of this winding are bent when placed in the stator slots.

A modification of the proposed generator and frequency changer as illustrated in Figs. 10–13 is distinguished by the fact, that the exciting coils 0, 0' are concentrated in two large grooves or slots M, M' of the stator arranged opposite each other in a diametrical plane D, D' of the rotor. Fig. 12 shows the coil 0 in its initial form, that is to say before the same is put into the slot of the stator. When this coil is placed into the said slot, the ends $z$ and $z'$ are bent towards the front side of the stator, as shown on Fig. 13 by full lines or as shown on the same figure by dotted lines (see also Fig. 11). In place of separate excitation coils for such half of the apparatus, a single coil 0 may be used as shown in Figure 11. A current flowing in the windings of such a coil produces a magnetic field in the directions indicated in dotted and full line arrows in Figure 10. When the apparatus is used only as a frequency changer, this winding may serve as the other windings of the stator, and will carry an alternating current.

As the magnetic flux passing through the stator attains its maximum value in the diametrical plane D, D' and its minimum value in a plane at right angle to the said diametrical plane, and as the value of the said flux increases from the last named plane to the diametrical plane D, D', it is preferable and saving of iron to give the stator the shape of an elongated ring body having its greatest dimension in the plane in which the coils 0 and 0' are arranged. As the full period of pulsation of the magnetic conductance for the coils 1, 2, etc., placed in the slots $e$ is equal or corresponds to a rotation of the rotor for an angle 2 $\alpha$, it will be necessary, in order to obtain opposite pulsations of the magnetic conductances in both halves of the apparatus, to displace the teeth $g$ of one half with reference to those, $g'$, of the other half by an angle $\alpha$.

The shaft of the rotor is magnetically insulated by means of a tube 1 made of non-magnetic material (copper, bronze, aluminium) in order to prevent the penetration into the shaft of magnetic fluxes of high frequency. The iron of the stator must also be similarly insulated from other masses of iron or steel which may form a part of the apparatus. In all other respects the apparatus shown in Figs. 10–13 is of a construction similar to that of Fig. 3 and the coils of this apparatus are connected in the manner described with reference to Figs. 8, 8ᵃ and 9. The arrangement of the coil 0, or a group of coils 0, 0', in a single pair of diametrically opposite slots as illustrated in Figures 10 and 11, presents certain practical advantages over the structure previously described, which make for an increase in efficiency in the apparatus without materially increasing the dimensions of the same. It permits of a greater number of turns being given to these coils and at the same time leaves the remaining slots of the stator free for the insertion of additional coils, the function of which has already been described.

Figures 14, 14A, 15, 16:
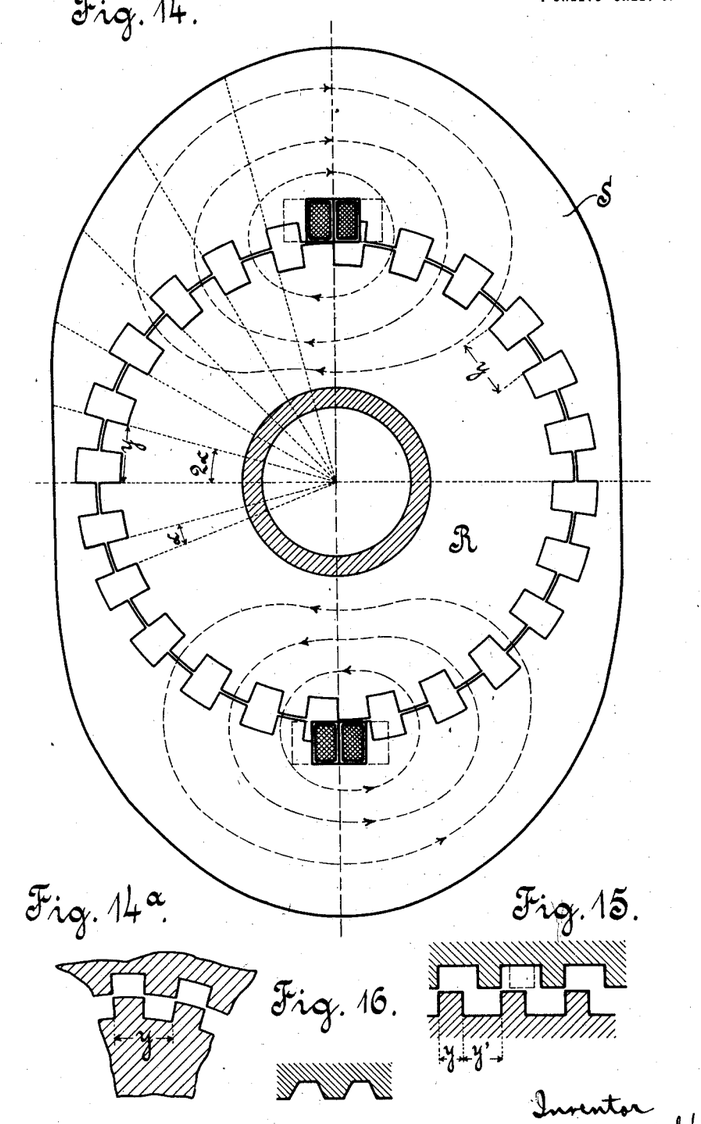

Figs. 14 and 14ᵃ show another form of generator and frequency changer constructed in accordance with the principles of this invention in which the rotor R, R' and the stator S, S' are provided with teeth on adjacent cylindrical surfaces, the number and dimensions of the teeth being the same on both said parts of each half of the machine. This construction is distinguished by the fact that all the coils 0, 1, 2, 3 . . . of each half of the stator are concentrated in slots arranged diametrically opposite to each other.

When the rotor and the stator occupy the relative position shown on Fig. 14 the value of the magnetic conductance reaches its maximum, whereas the value of this conductance attains its minimum at the position shown on Fig. 14ᵃ. The full period of pulsation of the said conductance corresponds to a rotation of the rotor through the angle 2 α, which is the angle subtended by the polar pitch Y of the rotor or stator. Therefore it will be necessary to displace the teeth of the rotor or stator of the second half of the apparatus with reference to the teeth of the corresponding part of the first half by the angle α in order to obtain opposite phases of the magnetic pulsation in the two halves of the machine. The same result may be however attained by a simultaneous displacement of the teeth on the rotor part and stator part of one half of the apparatus in reference to the teeth of the respective parts of the other half, provided the final result of these displacements should be such, that the relative position of the teeth of both the rotor and stator in one half of the apparatus should be as represented on Fig. 14, while at the same time the teeth of the rotor and stator parts in the other half must be in the relative position represented on Fig. 14ᵃ. Generally the relative position of the said teeth in the one half of the machine should be such as to secure the maximum magnetic conductance, at the moment at which the teeth of the rotor and stator on the other half of the same occupy the relative position corresponding to the minimum of magnetic conductance. Any suitable mechanical device may be provided to regulate the relative displacement of the teeth.

The advantages of the construction represented on Figs. 14 and 14ᵃ are as follows: 1, all the coils are concentrated in the vicinity of one and the same diametrical plane, so that all the coils may be of a greater volume, and an increased efficiency and power of the apparatus will be secured without increasing the dimensions of the same, and 2, at one and the same speed of a circumferential point of the rotor, a greater primary, and in consequence, also a greater final frequency may be secured. This latter effect is attainable due to the fact, that with this construction the pitch $y$ of the teeth of the stator and rotor may have a maximum value resulting in the greatest possible primary frequency $f$. In the constructions as shown on Figs. 3 and 10 the slots or grooves $e$ on the inner periphery of the stator limit the maximum value of the pitch of the polar projections, which must be such that slots or grooves $e$ of a sufficient breadth for a system of coils could be provided in the stator. These structural limitations do not apply to the apparatus constructed as shown in Figure 14, and hence the teeth may be of much smaller dimensions.

Harmonics of higher frequencies may be produced and strengthened by using teeth of a special shape either on the stator or on the rotor or on both parts. Teeth shaped to produce this result are shown in Figure 16, and a similar result is obtained by making the toothed projections and intervening slots of unequal widths as shown in Figure 15.

Figure 17:
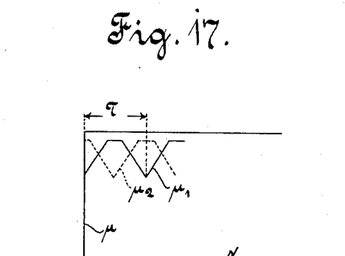
Figure 17 illustrates diagrammatically by curves $\mu_1$ and $\mu_2$, the changes in magnetic conductance in a machine the polar projections of which are of the form shown in Figure 16.

Fig. 17 shows diagrammatically the change of the magnetic conductance during the rotation of the rotor for a tooth of the shape represented in Fig. 16, the full line $\mu_1$ showing for a given period of time the character of changes of the magnetic conductance for one half of the apparatus, and the dotted line $\mu_2$ for the other half of same.

Figure 18:
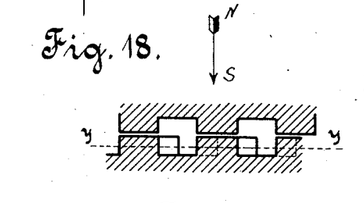
Figures 18 and 19 show a modification of the construction illustrated in Figure 14, in which the rotor of each half of the machine is composed of two elements, the teeth or polar projections of which are in stepped relation.

Figure 18 shows a development of a further modification of the machine illustrated in Figure 14. The rotor, in this case, of each half of the machine, is constructed of two similar elements which are displaced by an angle corresponding to a quarter of a period. This gives a stepped appearance to the teeth of the rotor and is clearly shown in Figure 19, which is a sectional view on the line $y-y$ of Figure 18. In this figure (Figure 19) the displaced teeth or polar projections are indicated by the reference characters $z, z'$, and their relative displacement, which is equal to the one-half of the width of a tooth or $\frac{a}{2}$ corresponds to a phase angle of 90°. The same result may be attained by applying this construction to the teeth of the stator instead of the rotor.

Figure 20:
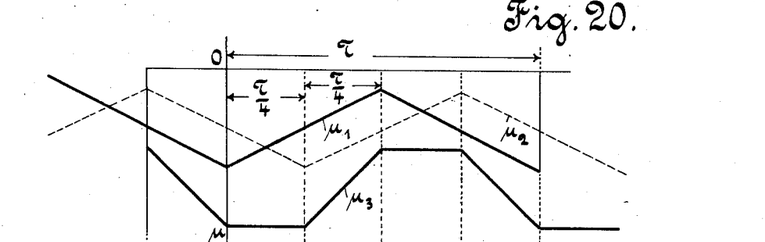
Figure 20 illustrates diagrammatically by curves the changes in magnetic conductance in one rotor element of a machine having teeth displaced as shown in Figures 18 and 19.

On Fig. 20 the line $\mu_1$ represents the character of changes of magnetic conductance for the flux passing through the step $z$ of the teeth, and the line $\mu_2$—which lags for a quarter of a period—represents the same changes for the magnetic flux passing through the second step $z'$ of the said teeth.

Under these conditions the alternations of the resulting magnetic conductance may be represented by the line $\mu_3$, which line is obtained by adding the ordinates of the lines $\mu_1$ and $\mu_2$.

Figure 21:
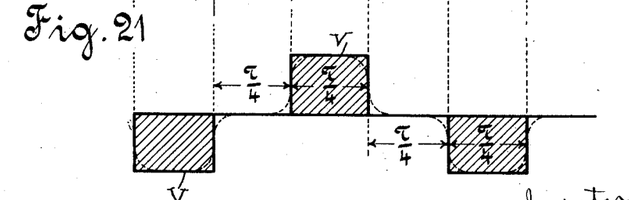
Figure 21 shows the character of the voltage induced in the stator windings of a machine, the rotor of which is provided with teeth arranged in the stepped relation illustrated in Figures 18 and 19.

If the magnetic flux N—S (Fig. 18) is produced by a direct current, the line $\mu_3$ represents also the alternations of the flux itself passing through the iron of the rotor and stator during the rotation of the first named part of the machine, and the line $v$ on Fig. 21 represents the alternations of the electromotive force within the windings of the stator, which is induced by the pulsations of the said magnetic flux N—S. The said line $v$ comprises positive and negative parts, each of which corresponds to a quarter of a complete period $\tau$ being separated from each other by zero intervals corresponding also to a quarter of a period. Thus it will be seen that the induced electromotive force changes in accordance with the changes in magnetic conductance, the zero portions of the curve coinciding in point of time, with the flat portions of the curve $\mu_3$, representing changes in magnetic conductance. The line $v$ comprises, as is clear from Fig. 21, sharply appearing odd harmonics and especially such of the third harmonic. By applying the method of resonance, the said harmonics may be strengthened and electromotive forces of increased frequencies received thereby.

Figure 19:
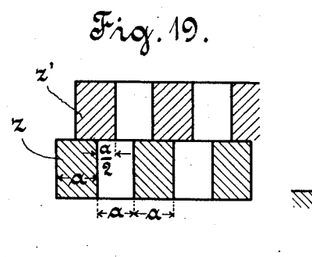
Figure 22:
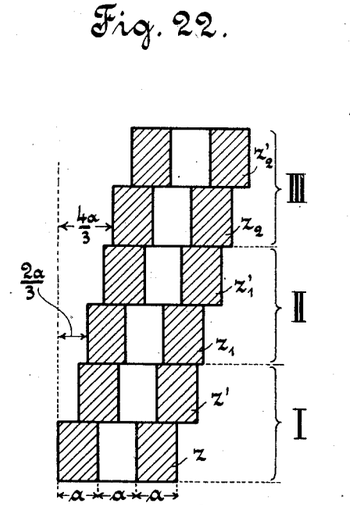
Figures 22 and 23 illustrate the application of the stepped tooth-arrangement of Figures 19 and 18 to a three phase machine.
Figure 23:
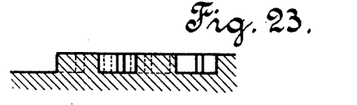

Figures 22 and 23 of the drawings show the stepped-tooth construction of Figures 18 and 19 applied to a three phase system, Fig. 22 being a section of the one half of the rotor or stator on the line of a cylindrical surface passing through the teeth of the rotor and Fig. 23 being a developed cross section of the stator or rotor, as the case may be. For the three phases there are provided three groups I, II and III of stepped teeth, each of which is the same as that shown on Figs. 18 and 19. The separate groups are successively displaced with reference to each other for a distance corresponding to a third of a period, viz: the value $2^a:3$, where $2^a$ represents the pitch corresponding to one period.

With such an arrangement of the teeth of the stator or rotor, the electromotive forces of primary frequency existing in the coils of the stator (or rotor) will, in accordance with the laws of the three phase system, mutually compensate each other and give no current, whereas harmonics the order of which is a multiple of 3 will be arithmetically added to each other. In view of the fact, that the harmonics of a triple frequency are more sharply expressed, than all the others (Fig. 21), there will be produced in the windings of the stator or rotor mainly an electromotive force of triple frequency.

This method of producing a triple frequency may be applied to machines having laminated rotors and stators of the type shown in Figures 3, 10, 11 and 14 and also to generators of the inductor type in which the rotor and stator consist of masses of iron or steel.

What I claim is:

1. An alternating current generator and frequency changer of the character described comprising two or more dynamo electric machines mounted on a common shaft, primary and secondary windings in inductive relation on each machine, the primaries and secondaries of the two machines being connected to each other in such a manner that currents will flow through one pair in the same direction and will be opposed in the other pair, and means for varying the reluctance of the flux paths in each machine in such a manner that currents of different frequencies will be induced in the primary and secondary windings of the machines, substantially as described.

2. An alternating current generator and frequency changer of the character described, comprising two or more dynamo electric machines mounted on a common shaft, primary and secondary windings in inductive relation on each machine, the primaries and secondaries of the two machines being connected to each other in such a manner that currents will flow through one pair in the same direction and will be opposed in the other pair, and means for producing pulsations of the permeance of the magnetic circuit of each machine, said pulsations differing in phase relations in the two machines, whereby currents of different frequencies are induced in the primary and secondary windings of the machines, substantially as described.

3. A frequency changer of the character described, the combination of two or more dynamo electric machines mounted on a common shaft, consisting of laminated rotor and stator elements, and a plurality of inductive windings on the stator element of each machine, one set of coils on one machine being connected in series with a corresponding set on a second machine in such a manner that currents tend to circulate in the two sets of coils in opposite circular directions, a second set of coils on the stator of each machine also connected in series but in such a manner that induced currents tend to circulate in the respective sets of coils in the same circular directions, and polar projections on the rotor elements of each machine, the polar projections of one rotor being angularly displaced relatively to those of a second rotor in such a manner that the pulsations of magnetic conductance produced by the rotation of the rotors will be opposite in phase relation in the two machines, substantially as described.

4. A frequency changer of the character described, the combination of two or more dynamo electric machines mounted on a common shaft, consisting of laminated rotor and stator elements, and a plurality of inductive windings on one element of each machine, one set of coils on one machine being connected in series with the like wound coils of a second machine, and other windings of one machine being connected with oppositely wound coils of the second machine, and polar projections on the unwound element of the machines, this latter element of one machine being angularly displaced relatively to the corresponding element of the other machine by a distance equal to one half the width of a polar projection, substantially as described.

5. Apparatus for changing the frequency of an alternating current from a given value to any multiple of this value, comprising machines in the nature of transformers with rotating cores mounted on a common shaft, the primaries of the transformers being connected in series and the secondaries opposed, the rotating cores of the machines having toothed perimeters which are relatively displaced for an angle corresponding to one fourth the pitch of a tooth, in combination with resonant external circuits for reinforcing the electromotive forces of any desired harmonics, substantially as described.

6. In apparatus for transforming the frequency of an alternating current, the combination with two or more dynamo electric machines, of the inductor alternator type, grouped in pairs and mounted on a common shaft, a plurality of windings, including an excitation winding, arranged in inductive relation in slots of the stator elements of each machine, certain windings of one machine being connected in series with correspondingly wound coils of a second machine, and other windings of the one machine being connected with oppositely wound coils of a second machine, a toothed rotor element for each machine, the corresponding elements of two machines the stator windings of which are electrically connected, being relatively displaced by an angle corresponding to one half the width of a rotor tooth, substantially as described.

7. In apparatus for transforming the frequency of an alternating current, the combination of a plurality of dynamo electric machines of the inductor alternator type mounted on a common shaft, a plurality of windings in inductive relation arranged symmetrically in the slots of the stator element of each machine, certain windings of each machine being connected in series with like wound coils of a second machine, and other windings of the one machine being connected with oppositely wound coils of the second machine, and two machines thus connected, arranged in cascade order with two other machines similarly connected, a toothed rotor element for each machine, the rotors of two adjacent machines constituting one unit of the cascade arrangement being relatively displaced by an angle corresponding to one half the width of a rotor tooth, and the rotors of adjacent units of the cascade arrangement also relatively displaced, substantially as described.

In testimony that I claim the foregoing as my invention I have signed my name in presence of two subscribing witnesses.

NIKOLAI OBOUKHOFF.

Witnesses:
H. A. LOVIAGEUNE,
WILLIAM STEININGER.